(12) United States Patent
Hong et al.

(10) Patent No.: US 10,995,904 B2
(45) Date of Patent: May 4, 2021

(54) OPTICAL MODULE HAVING RETRACTABLE STRUCTURE

(71) Applicant: Global Technology Inc., Ningbo (CN)

(72) Inventors: Qilin Hong, Ningbo (CN); Taotao Ye, Ningbo (CN); Kejun Chen, Ningbo (CN)

(73) Assignee: Global Technology Inc., Ningbo (CN)

( * ) Notice: Subject to any disclaimer, the term of this patent is extended or adjusted under 35 U.S.C. 154(b) by 293 days.

(21) Appl. No.: 16/293,036

(22) Filed: Mar. 5, 2019

(65) Prior Publication Data

US 2019/0383442 A1 Dec. 19, 2019

(51) Int. Cl.
*G02B 6/36* (2006.01)
*F16M 13/02* (2006.01)
*G02B 6/42* (2006.01)
*G02B 6/44* (2006.01)
*G02B 6/54* (2006.01)
*G02B 6/38* (2006.01)

(52) U.S. Cl.
CPC ......... *F16M 13/022* (2013.01); *G02B 6/4292* (2013.01); *G02B 6/44* (2013.01); *G02B 6/4477* (2013.01); *G02B 6/4478* (2013.01); *G02B 6/54* (2013.01); *G02B 6/3887* (2013.01); *G02B 6/4471* (2013.01)

(58) Field of Classification Search
CPC .. F16M 13/022; G02B 6/4292; G02B 6/3893; G02B 6/4281; G02B 6/3838; G02B 6/4236; G02B 6/3887; G02B 6/4471; G02B 6/4477; G02B 6/4478; G02B 6/44; G02B 6/54
USPC .............. 248/544; 385/88, 89, 92, 136, 137; 398/135, 139, 200, 201, 212, 214
See application file for complete search history.

(56) References Cited

U.S. PATENT DOCUMENTS

| | | | |
|---|---|---|---|
| 10,261,269 B2 * | 4/2019 | Moriyama | G02B 6/4478 |
| 2016/0259137 A1 * | 9/2016 | Akabane | G02B 6/3829 |
| 2017/0003464 A1 * | 1/2017 | Akieda | G02B 6/4261 |
| 2017/0082810 A1 * | 3/2017 | Daikuhara | G02B 6/4261 |
| 2018/0131448 A1 * | 5/2018 | Yagisawa | H04B 10/801 |
| 2018/0172930 A1 * | 6/2018 | Kanda | H04B 10/503 |
| 2018/0284363 A1 * | 10/2018 | Zhang | G02B 6/4281 |
| 2019/0097735 A1 * | 3/2019 | Akieda | G02B 6/4257 |
| 2019/0219781 A1 * | 7/2019 | Kurashima | G02B 6/4277 |

* cited by examiner

*Primary Examiner* — Todd M Epps
(74) *Attorney, Agent, or Firm* — Grossman Tucker Perreault & Pfleger, PLLC

(57) ABSTRACT

An optical module is disclosed. The disclosed optical module may include a retractable structure having a housing and an upper cover. A clip component for connecting to a chassis is arranged within the housing. A release component for controlling the clip component is arranged on the upper cover. More space within the housing can be available for internal components of the optical module.

9 Claims, 3 Drawing Sheets

OPTICAL MODULE HAVING RETRACTABLE STRUCTURE

TECHNICAL FIELD

The present disclosure relates to optical communication, and more particularly, to an optical module having a retractable structure.

BACKGROUND

Optical modules generally include a retractable structure for ensuring a firm and stable connection between the optical module and a chassis and preventing interruption of signal transmission when the optical module is inserted. The retractable structure can also allow removal of the optical module from the chassis when it is needed.

In prior arts, the optical module is usually connected with the chassis through a slip structure, i.e., an elastic slip that is arranged at the bottom of the optical module. A through hole allowing for the clip component to be inserted into is arranged at the bottom of the corresponding chassis. The clip component would be bent inwards when the optical module is inserted into the chassis. After the optical module has been properly positioned, the clip component will retract and emerge from the through hole at the bottom of the chassis to secure the connection between the optical module and the chassis. When the optical module needs to be removed, a loosening mechanism is needed to bend the clip component inwards again to release it from the through hole at the bottom of the chassis. After that, the optical module can be removed. However, in the prior arts, the retractable structure that requires the loosening mechanism inside the housing of the optical module inevitably would take up a part of the space within the housing of optical module. This will result in positional arrangement of the various functional components inside the optical module.

SUMMARY

An objective of the present disclosure is to provide an optical module with a retractable structure that reduces space occupation inside the housing of the optical module.

One embodiment discloses an optical module with a retractable structure. Such optical module may include a housing and an upper cover. A clip component for connecting to a chassis is arranged within the housing, and a release component for controlling the clip component is arranged on the upper cover.

In an embodiment, the release component may include a handle to retract the clip component, a spring for resetting the handle, and a reed for resetting the clip component.

In an embodiment, the upper cover may include a guide groove to receive the spring, and the handle comprises a block to extend into the guide groove and abut against the spring.

In an embodiment, the guide groove may include a notch for inserting the block, and the notch is an inclined notch.

In an embodiment, the clip component may include a base and a fastener arranged on the base. Each side of the base may include a fixing component. The handle may include a support component for contacting the fixing component, and a protrusion component provided on the support component for lifting the base.

In an embodiment, the fixing component may include a first inclined surface, the protrusion component may include a second inclined surface, and the first inclined surface is adapted to fit with the second inclined surface.

In an embodiment, the fastener may include a recess to fit with the support component, and the fastener is arranged on the two sides of an inner cavity of the housing.

In an embodiment, the upper cover may include a mounting seat, and the reed and the clip component are sequentially disposed on the mounting seat.

In an embodiment, the handle may include a ring, and the ring is rotatably connected with the handle.

The embodiments of the present disclosure have the following advantages over prior arts: the release component is disposed on the upper cover and only occupies reduced space on the upper cover. Consequently, more internal space can be reserved for the functional components of the optical module.

BRIEF DESCRIPTION OF THE DRAWINGS

The present disclosure is illustrated by way of example and not limitation in the figures of the accompanying drawings, in which like references indicate similar elements, and in which.

REFERENCE NUMBERS 1 housing, 2 upper cover, 3 clip component, 4 handle, 5 spring, 6 reed, 7 guide groove, 8 block, 9 notch, 10 base, 11 fastener, 12 fixing component, 13 support component, 14 protrusion component, 15 first inclined surface, 16 second inclined surface, 17 recess, 18 mounting seat, 19 ring.

DETAILED DESCRIPTION

Embodiments of the present disclosure will be described in further detail hereinafter with reference taken to the accompanying drawings.

Figure 1:
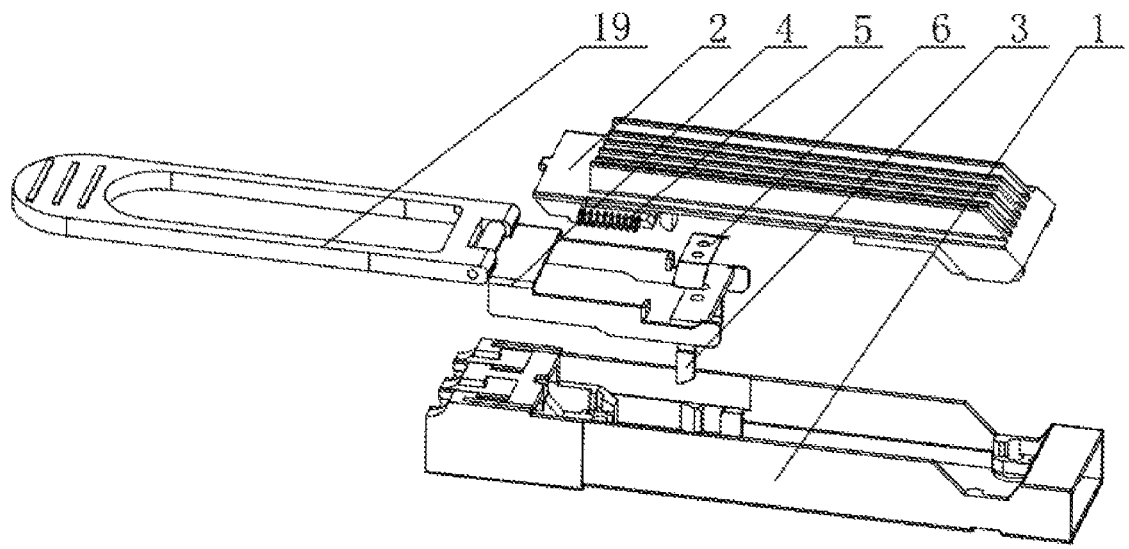
FIG. 1 is an explosive view of a retractable structure of an optical module according to an embodiment of the present disclosure.

FIG. 1 shows an explosive view of the retractable structure of the optical module of an embodiment of the present disclosure. The optical module includes a housing 1 and an upper cover 2 joining with the housing 1 to define an internal space. A retractable structure may include a clip component 3 disposed in the housing 1, and a release component disposed on the upper cover 2. The release component is mainly used to control the motion of the clip component 3.

Figure 2:
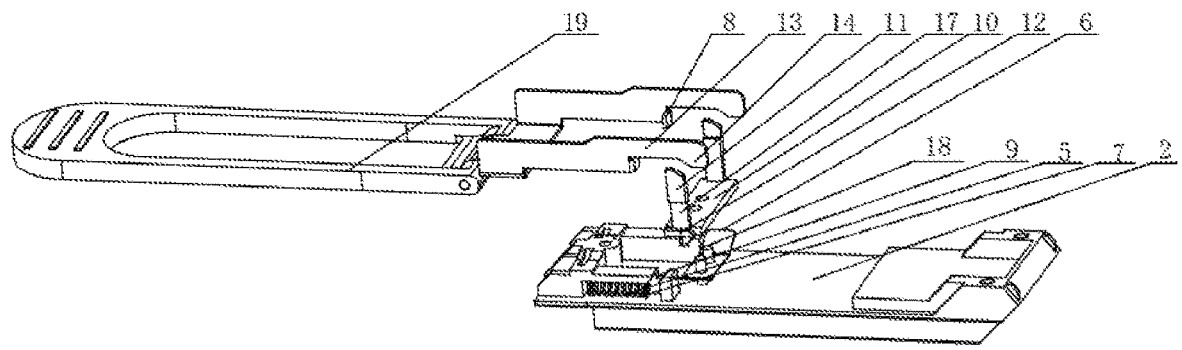
FIG. 2 is an explosive view of the retractable structure having a housing removed according to an embodiment of the present disclosure.
Figure 4:
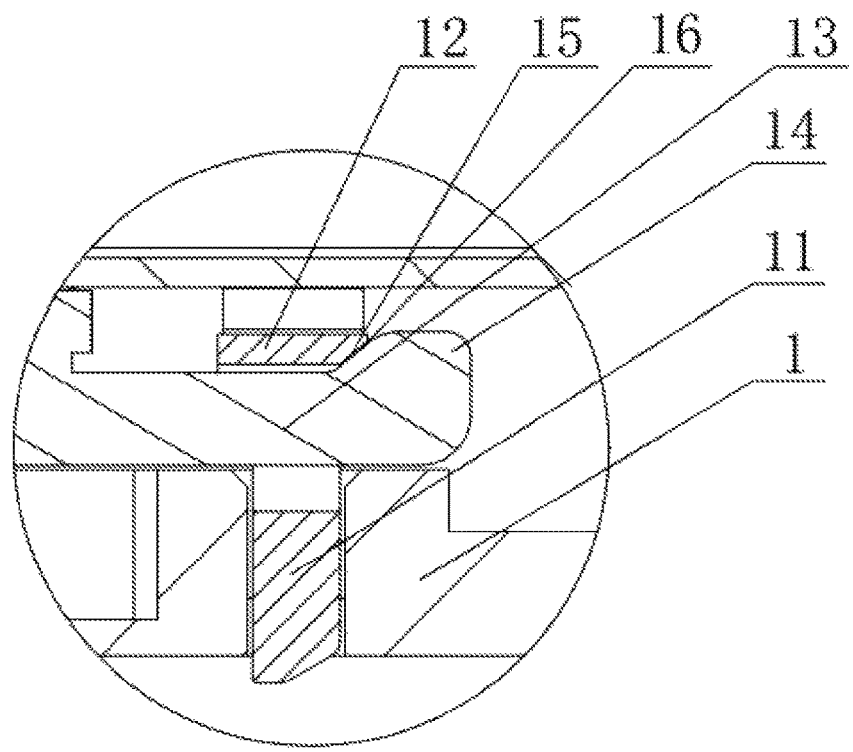
FIG. 4 is an enlarged view of the part A in FIG. 3.

FIG. 2 shows an explosive view of the optical module with the housing 1 removed. It can be seen that the release component may include a handle 4, a spring 5, and a reed 6. The clip component 3 has a base 10 and a fastener 11 arranged on the base 10. Each side of the base 10 may further include a fixing component 12. Two support components 13 are provided. Each support component 13 may include a protrusion component 14 on an end that is further away from the handle 4. The handle 4 may also include two blocks 8. In this embodiment, the block 8 is perpendicularly disposed with respect to the support component 13 and the protrusion component 14. The fixing component 12 may include a first inclined surface 15 shown in FIG. 4. The protrusion component 14 may include a second inclined surface 16 also shown FIG. 4. The protrusion component 14 contacts with the support component 13 on the second inclined surface 16. The slope angles of the first inclined surface 15 and the second inclined surface 16 can be identical or similar in one embodiment. The upper cover 2 may include two mounting seats 18 in the shape of cylindrical columns. Guide grooves 7 are arranged on two sides of the upper cover 2. It is worth noting that the optical module is turned upside down in FIG. 2 (as opposed to FIG. 1). The spring 5 is arranged within the guide groove 7. The length of the spring 5 in a normal state is less than the length of the guide groove 7. The guide groove 7 has an inclined notch 9 on its side wall. Since the support components 13 and the protrusion component 14 may be in contact with the fixing component 12 as illustrated in FIG. 4, the fastener 11 may further include a recess 17 for the support components 13 and the protrusion component 14 to pass thorough. The handle 4 may include a rotatably connected ring 19 to facilitate manual operation by the user.

When installed, the reed 6 and the base 10 are in turn arranged on the mounting seat 18, and then the two blocks 8 on the handle 4 are inserted into the inclined notch 9 to press against one end of the spring 5. Since the blocks 8 are inserted into the inclined notch 9, the blocks 8 are less likely to slide out of the notch 9 when the blocks 8 are in a vertical position instead of an inclined position. The handle 4 might just slide within the guide groove 7 in accordance with the movement of the blocks 8 and therefore it might not detach from the guide groove 7. The support components 13 or the protrusion component 14 on the handle 4 would contact with the fixing component 12 of the clip component 3. Consequently, the clip component 3 and the reed 6 may be pressed against the mounting seat 18 of the upper cover 2. The handle 4, the spring 5, the reed 6 and the clip component 3 may be secured on the upper cover 2 without using a fixing member such as a screw. The entire release component can be arranged on the upper cover 2, without occupying too much of the internal space inside the housing 1. Only exception here might be the fastener 11 on both sides of the inner wall of the housing 1.

The clip component 3 is moveable in the vertical direction. The reed 6 is to press down the clip component 3 so that the clip component 3 may return to its original position after being pressed down. The spring 5 is to apply an elastic force to the handle 4, so that the handle 4 can be reset automatically.

Figure 3:
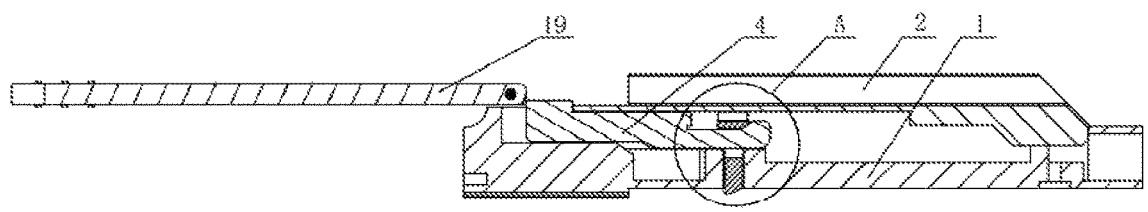
FIG. 3 is a sectional view of the retractable structure when the clip component in a released state according to an embodiment of the present disclosure.

As shown in FIG. 3 and FIG. 4, the clip component 3 can extend out of the housing 1 of the optical module and lock onto the chassis, at which point the fixing component 12 and the handle 4 would be in contact with the support component 13 under the elastic force of the reed 6. The fastener 11 protrudes from the housing 1 of the optical module to fit with the through hole on the chassis and lock the optical module to the chassis.

Figure 5:
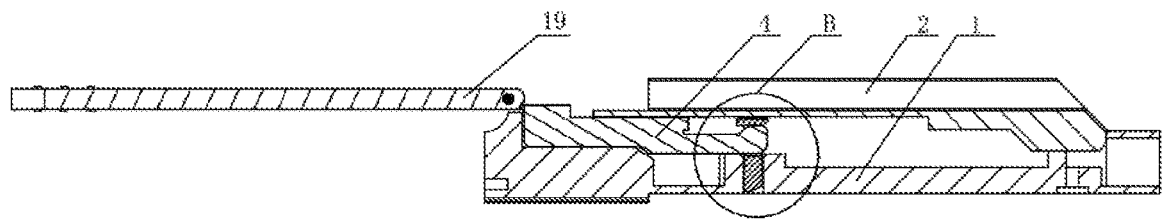
FIG. 5 is a sectional view of the retractable structure when the clip component in a bent state according to an embodiment of the present disclosure.
Figure 6:
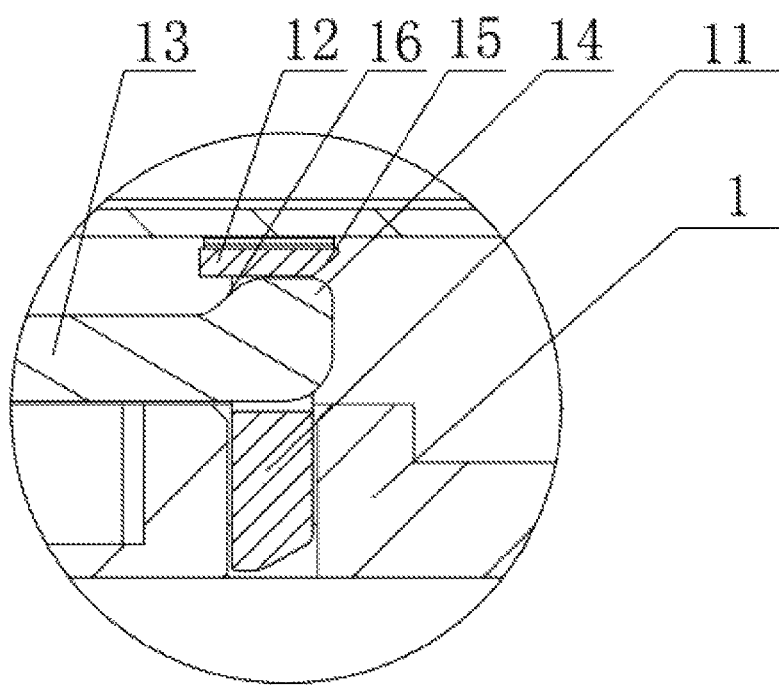
FIG. 6 is an enlarged view of the part B in FIG. 5.

When the user pulls the handle 4 outwardly, the handle 4 would pull the support component 13 to move along the same direction. At this time, the fixing component 12 may remain unmoved, separating the support component 13 from the fixing component 12. Then, the protrusion component 14 would abut against the fixing component 12 as shown in FIG. 5 to FIG. 6. The clip component 3 is in a retracted state where the clip component 3 will enter the housing 1 of the optical module and become released from the chassis. In this state, the base 10 is lifted up by the protrusion component 14 and the reed 6 is compressed. The reed 6 and the fastener 11 would be driven together to lift up so that the fastener 11 would enter the housing 1 of the optical module again. Therefore, the housing 1 of the optical module can be removed from the chassis.

When the user releases the handle 4, the handle 4 will move under the elastic force of the spring 5 to move the block 8 and reset the retractable structure. At this time, the support component 13 and the fixing component 12 are once again pressed against each other. The base 10 is reset under the elastic force of the reed 6, and then the fastener 11 again extends out of the housing 1 of the optical module to hold onto the chassis.

The foregoing description of the embodiments has been provided for purposes of illustration and description. It is not intended to be exhaustive or to limit the disclosure. Variations or modifications of the embodiments are not to be regarded as a departure from the disclosure, and all such modifications are intended to be included within the scope of the disclosure without departing from the principle thereof.

What is claimed is:

1. An optical module, comprising:
    a housing, an upper cover, and a retractable structure, wherein the retractable structure further comprises:
    a clip component for connecting to a chassis arranged within the housing, and
    a release component for controlling the clip component arranged on the upper cover.

2. The optical module of claim 1, wherein the release component comprises a handle to retract the clip component, a spring for resetting the handle, and a reed for resetting the clip component.

3. The optical module of claim 2, wherein the upper cover comprises a guide groove to receive the spring, and the handle comprises a block to extend into the guide groove and abut against the spring.

4. The optical module of claim 3, wherein the guide groove comprises a notch for inserting the block, and the notch is an inclined notch.

5. The optical module of claim 2, wherein the clip component comprises a base and a fastener arranged on the base, each side of the base comprises a fixing component, and the handle comprises a support component for contacting the fixing component and a protrusion component provided on the support component for lifting the base.

6. The optical module of claim 5, wherein the fixing component comprises a first inclined surface, the protrusion component comprises a second inclined surface, and the first inclined surface is adapted to fit with the second inclined surface.

7. The optical module of claim 5, wherein the fastener comprises a recess to fit with the support component, and the fastener is arranged on two sides of an inner cavity of the housing.

8. The optical module of claim 2, wherein the upper cover comprises a mounting seat, and the reed and the clip component are sequentially disposed on the mounting seat.

9. The optical module of claim 2, wherein the handle comprises a ring rotatably connected with the handle.

* * * * *